(12) United States Patent
Schleisiek et al.

(10) Patent No.: US 7,406,002 B2
(45) Date of Patent: Jul. 29, 2008

(54) METHOD AND APPARATUS FOR THE ACQUISITION OF SEISMIC MOVEMENTS

(76) Inventors: Klaus Schleisiek, Breite Strasse 159, Hamburg (DE) D-20099; Mark Bolduan, Fruchtallee 126, Hamburg (DE) D-20099

( * ) Notice: Subject to any disclaimer, the term of this patent is extended or adjusted under 35 U.S.C. 154(b) by 233 days.

(21) Appl. No.: 10/947,141

(22) Filed: Sep. 23, 2004

(65) Prior Publication Data
US 2005/0068851 A1 Mar. 31, 2005

(30) Foreign Application Priority Data
Sep. 25, 2003 (DE) ............................... 103 44 558

(51) Int. Cl.
*G01V 1/18* (2006.01)
(52) U.S. Cl. ...................... 367/182; 367/185
(58) Field of Classification Search ......... 367/182–185
See application file for complete search history.

(56) References Cited

U.S. PATENT DOCUMENTS

| | | | | |
|---|---|---|---|---|
| 4,152,692 A | * | 5/1979 | McNeel | 367/182 |
| 5,172,345 A | * | 12/1992 | van der Poel | 367/178 |
| 7,099,235 B2 | * | 8/2006 | Kamata | 367/182 |
| 2005/0201206 A1 | * | 9/2005 | Luc | 367/182 |

OTHER PUBLICATIONS

Yin et al., "A High-resolution wideband digital feedback system for seismometers," J. Phys. E: Sci. Instrum. 21 (1988), 748-752.*

* cited by examiner

*Primary Examiner*—Ian J Lobo
(74) *Attorney, Agent, or Firm*—Friedrich Kueffner

(57) ABSTRACT

The method and the apparatus disclosed serve to acquire seismic induced movements. A coil and a permanent magnet are contained in an enclosure and the seismic movements induce a relative movement between said coil and said magnet. The current induced into the coil is appraised as a measure of said seismic movement. The position of the coil in relation to the permanent magnet is monitored by a position sensor. A closed loop control generates a current that is fed into the coil so that the coil settles at a given neutral position relative to the permanent magnet.

17 Claims, 5 Drawing Sheets

METHOD AND APPARATUS FOR THE ACQUISITION OF SEISMIC MOVEMENTS

CROSS-REFERENCE

German Patent Application 103 44 558.7 Priority Date: 25 Sep. 2003

BACKGROUND TO THE INVENTION

The present invention is directed, in general, to the field of seismic exploration and seismology and, more particularly, to seismic sensors such as geophone assemblies. It also encompasses a method and apparatus for compensating the effect of gravity on seismic sensors as well as a method and apparatus to overcome the bandwidth limitations of geophones towards long wavelengths.

3-component seismometers are being used in geophysics to explore structures below the earth's crust. Whereas the vertical alignment of a seismometer can be easily accomplished on land, this calls for elaborate mechanical and lately electronic appliances on the seabed.

Seismometers often contain geophones as sensors. In principle, an electrodynamic geophone comprises a coil, a magnet and a suspension, which allows the coil to move only in one direction relative to the magnet and the magnetic field is directed in such a way that said movement induces a current in the coil.

Depending on the construction most often the magnet or the coil is attached to an enclosure, which is coupled to the area under investigation. Due to the inertia of the moving part a current is induced in the coil, which is proportional to the ground motion. Common constructions are disclosed in U.S. Pat. No. 3,718,900 and U.S. Pat. No. 4,152,692.

Different types of geophones are used for horizontal and for vertical measurements relative to the direction of gravity. The vertical geophone compensates the influence of gravity by pre-stressing the suspension of the moving part. A horizontal geophone does without pre-stress.

In order to detect ground movements in all directions, one vertical geophone and two horizontal geophones at a time are assembled into a three component seismometer such that vertical, north-southern, and east-western ground motions can be detected independently from each other after appropriate leveling. Such arrangements have been used in prospection geophysics for many years. An alternative assembly that is mainly used for broadband seismology only comprises one single type of geophone and became known as "Galperin arrangement". A drawback for earthquake geophysics (seismology) is the fact that below the eigenfrequency of the moving part the sensitivity of a geophone declines rapidly. The eigenfrequency of manufactured geophones is in the range of 1 to 20 Hz. Seismology studies ground motions from 1 milliHz to 20 Hz. Therefore, geophones for prospection geophysics are unsuitable for seismology.

A paper by E. Wielandt, "Design Principles of Electronic Inertial Seismometers", published in "Earthquakes: Observation, Theory and Interpretation", 1983, LXXXV Corso, Soc. Italiana di Fisica, Bologna, describes arrangements that detect ground motions in the seismological bandwidth. All contemporary so called "broadband seismometers" have in common that the spring mounted seismic mass is kept at rest relative to the seismometer's enclosure due to feedback by means of a position detector and an electrodynamic tracking arrangement, i.e. the seismic mass closely follows the ground motion. Thus the influence of the mechanical eigenfrequency on the propagation response is nullified. The measurement signal itself is derived from the feedback signal, which is proportional to the ground motion in the seismological bandwidth as well. An elaborate implementation is disclosed in U.S. Pat. No. 4,280,206.

U.S. Pat. No. 6,075,754 discloses a simple version of a similar arrangement that uses a standard geophone as the seismic mass, as acceleration detector, and as tracking means all at the same time.

The search for oil and gas is extended to deeper and deeper sea areas due to the continuing depletion of terrestrial and coastal reservoirs. The high cost of deep water operations asks for an increasing quality of seismic exploration and therefore, more and more often seismometers are deployed on the seabed in addition to the traditional registration of pressure waves using hydrophones on the water surface. Usually, mechanical arrangements, e.g. gimballed suspensions damped by high-viscosity fluids, are used for the necessary vertical alignment. The horizontal north-south and east-west orientation is accomplished either by means of an integrated compass or by recording seismic calibration pulses. Also, borehole seismic surveys are riddled by the fact that boreholes are no longer vertical and straight, but full of bends and even horizontal sections. Therefore, the present invention opens up new possibilities for seismic borehole sensors.

As early as 1998 EPRO GmbH, Germany in a product catalogue for "Vibration Transducer PR9268" describes that the coil of a transducer that has been mounted in a tilted position may be brought back into its operating position by injecting a suitable electrical compensation current, and U.S. Pat. No. 6,412,592 B1 discloses how such a compensation current can be automatically generated depending on the tilt angle by means of a potentiometer coupled to the geophone mechanically.

Document WO 03/096071 A1 discloses a method and arrangement to reduce the measurement error, which is due to the tilt of a geophone by feeding a compensation current into the geophone's coil that has been derived from a separate acceleration or tilt sensor. Thereby the residual error under all tilt conditions is diminished to an error that amounts to a maximum tilt angle of 10 degrees. Thus this method respectively this apparatus is suitable to compensate the tilt of geophones down to an eigenfrequency of 10 Hz without calibration.

Any discussion of the prior art throughout the specification should in no way be considered as an admission that such prior art is widely known or forms part of common general knowledge in the field.

It is the object of the present invention to specify a method and an apparatus of the aforementioned nature that fully compensates any tilt without calibration even for geophones under 10 Hz eigenfrequency using less energy than the arrangement disclosed in WO 03/096071 A1.

SUMMARY OF THE INVENTION

According to the present invention this object is met by a feedback arrangement using a position sensor inside the geophone's enclosure to detect the position of the coil relative to the magnet. A control circuit generates a current that is fed into the coil so that the coil will come to rest at a given position relative to the magnet in the absence of seismic excitation.

It is a further object of the present invention to construct an apparatus of the aforementioned nature so that leveling of a seismometer arrangement becomes superfluous.

According to the present invention this object is met by operating the coil in a feedback arrangement, in which the position compensation current fed into the coil will be dynamically increased or decreased by means of an integrator until the coil comes to rest at a given position under supervision of the position detector.

When such an enhanced geophone is tilted from a horizontal to a more vertical position its seismic mass will deviate from its operating position due to gravitational forces. This deviation will be detected by the position sensor and an accordant compensation current will be fed into the coil, which will bring back the seismic mass into its operating position. In this way the pre-stressed springs of a vertical geophone can be replaced by an electrical current that compensates gravity electrodynamically.

Alternatively, a vertical geophone could form the basis of the arrangement, in which, when tilted horizontally, the diminishing influence of gravity would be replaced by an accordant compensation current.

A very precise and small position detection can be accomplished by implementing the position sensor capacitively.

Alternatively, the position detection could be implemented inductively.

Furthermore, the position detection could be implemented optically.

Small forces are necessary for control when the seismic mass consists of a moving coil, whose position is detected by the position sensor inside the enclosure.

A further embodiment is based on detecting the position of the permanent magnet that can move inside the enclosure.

A preset operating position of the moving seismic mass is aided by suspending it with springs inside the enclosure.

Registration of ground motions in all spatial directions is accomplished by arranging three geophones orthogonally or in a so called "Galperin arrangement".

A typical dynamically controlled embodiment is capable of capturing seismic ground motions in a frequency range from 1 milliHz to 20 Hz.

A subsequent compensation for geophone tilt is aided by recording the magnitude of the compensation current that is fed into the coil.

In order to avoid an energy intensive data transfer while taking a seismic measurement we propose recording at least some of the produced measurement samples on a data logger.

A normalized representation of the recorded data according to the horizontal respectively vertical alignment of the geophones can be accomplished by executing a coordinate transformation based on the recorded magnitude of the compensation currents.

In one possible embodiment, the measurement data can be processed by analog circuitry.

In another embodiment, the measurement data can be processed digitally.

Subsequent normalization of the measurement data can be accomplished by executing the necessary processing concurrently.

Subsequent normalization of the measurement data without energy consumption constraints is supported by executing at least some of the necessary processing chronologically after the measurement.

Precise spatial correlation of the measured seismic data can be accomplished by appraising information from an electronic compass in addition to the geophone data.

Precise spatial correlation of the measured seismic data can be accomplished as well by recording information from an electronic inertial system shortly after (e.g. 1 hour) deployment of the seismometer.

Distortion of the measurement data by the eigendynamics of the geophone is avoided by generating a current in the coil in the presence of seismic movements so that a relative movement between the coil and the magnet is compensated. This way the arrangement remains within a narrow operating point even under seismic excitation.

A precise determination of the position of the coil relative to the magnet is accomplished by conditioning the measurement signal of the position sensor in an excited measurement bridge followed by a synchronous rectifier.

An advantageous filtering of the position information is accomplished by inserting a bandpass filter in between the measurement bridge amplifier and the synchronous rectifier.

BRIEF DESCRIPTION OF THE DRAWINGS

Preferred embodiments of the invention are described, by way of example only, with reference to the accompanying drawings in which.

DESCRIPTION OF THE INVENTION

Some sample embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1:
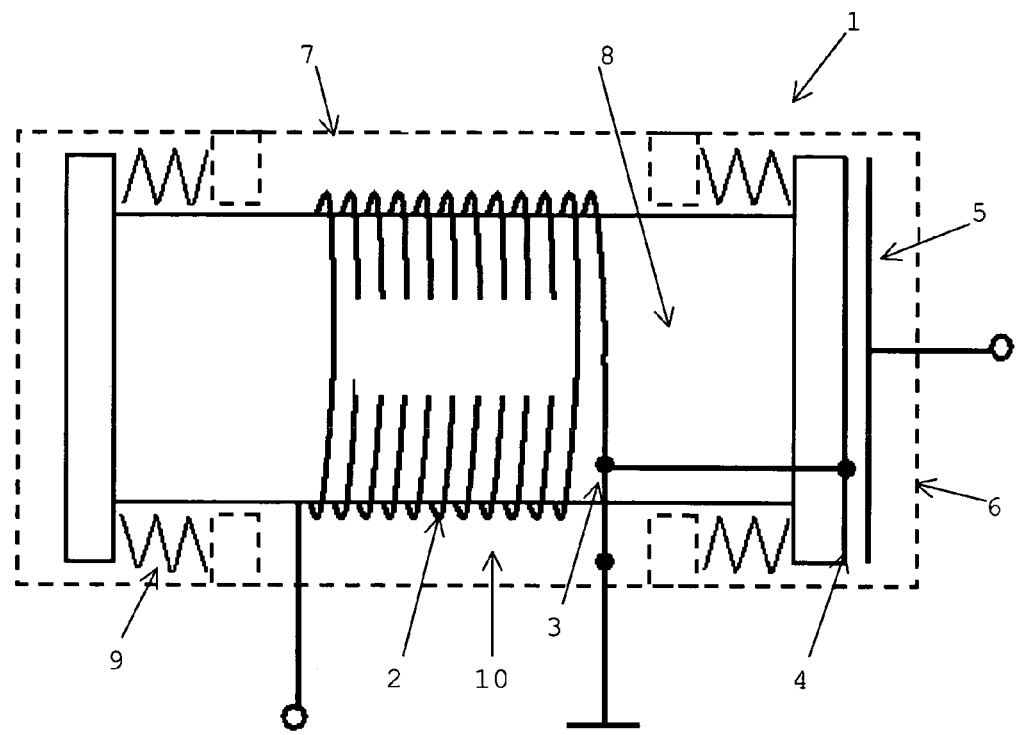
FIG. 1 is the schematic illustration of a coil arranged in an enclosure, which extends around a permanent magnet that is suspended between springs and an integrated capacitive position sensor, FIG. 2 charts the capacity of the position sensor in relation to the distance of the capacitor plates.
Figure 2:
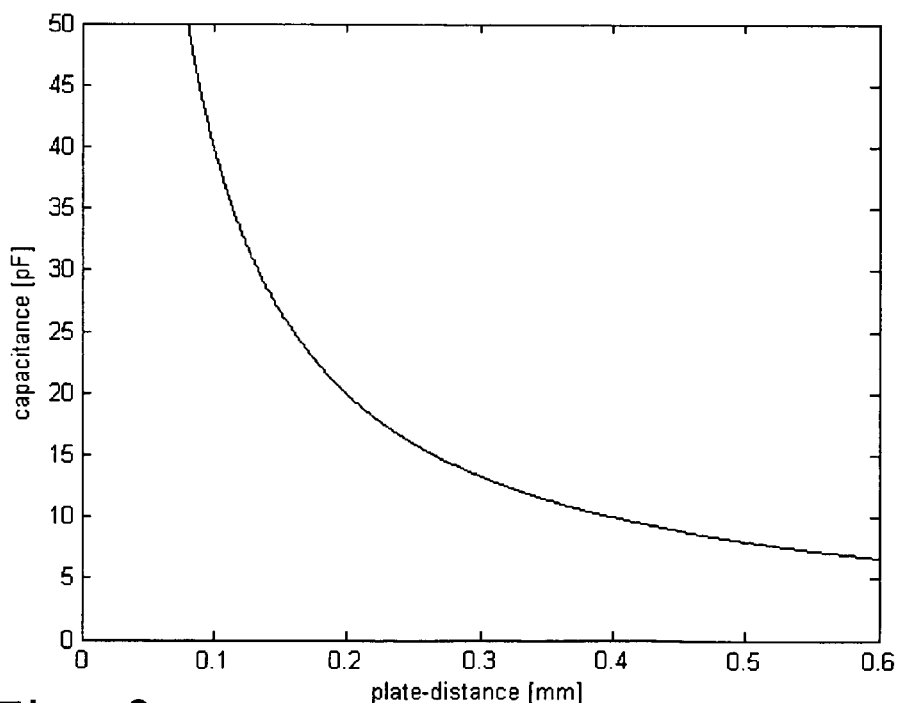

FIG. 1 is an outline of a geophone (1) whose permanent magnet (8) serves as the seismic mass. A coil (2) surrounds a region of the permanent magnet (8) and one end of the coil (3) is electrically connected to the ferromagnetic materials of the geophone. This end (3) usually is grounded in operation and it is electrically connected with an annular electrode (4) that is mounted to the seismic mass. Opposite the electrode (4) is a second electrode (5), which is mounted to the sealing cap (6) of the geophone enclosure (7). The sealing cap is made of an electrically insulating material. Both electrodes (4, 5) constitute a measurement capacitor, whose capacity depends on the position of the seismic mass as plotted in FIG. 2. Coil (2) extends around permanent magnet (8) and both are contained in enclosure (7). Springs (9) serve as elastic suspension for permanent magnet (8). The internal measurement capacitor (4, 5) constitutes the position sensor.

If more precision is needed, the capacitive position sensor may be realized as a differential capacitor consisting of three plates, the middle one of which would be constituted by or connected to the seismic mass. This eliminates the non-linear error introduced by the distance/capacity relationship of a dual plate arrangement shown in FIG. 2.

Figure 3:
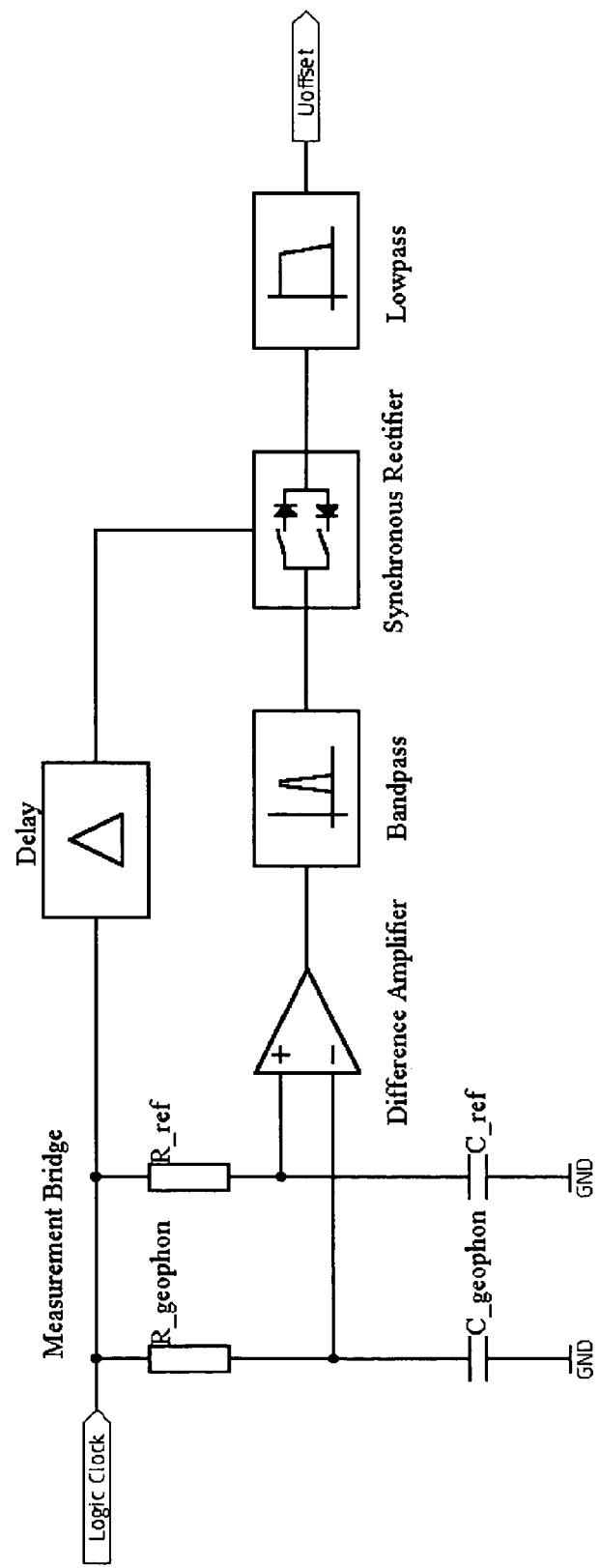
FIG. 3 is a block diagram of an electronic circuit that converts the momentary capacity of a capacitive position sensor into an offset voltage.
Figure 4:
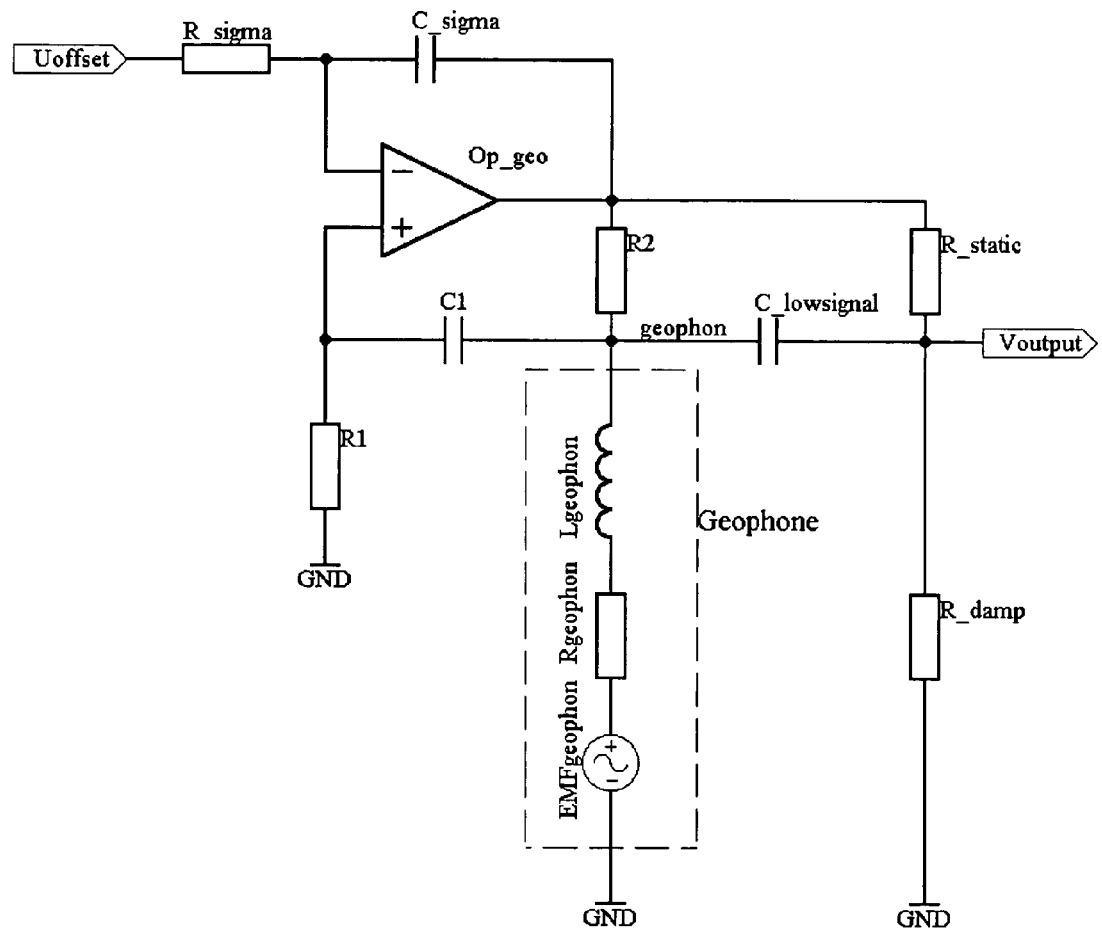
FIG. 4 is the circuit diagram of an electronic arrangement, which integrates a position displacement signal generated by the position sensor arrangement and injects a compensation current into the geophone while extracting the seismic induced current all at the same time and within one circuit.

When three geophones (1) that have been augmented by electronic circuits according to FIG. 3 and FIG. 4 have been assembled into a 3-component seismometer a specific compensation current is present in each of the geophones in relation to their vertical position. Depending on the strength of the compensation currents in each of the three geophones, the vertical alignment of the seismometer arrangement can be unambiguously determined when the electrodynamical sensitivity of each geophone (1) is known. Thus a provision of tilt information by external arrangements as disclosed in U.S. Pat. No. 6,412,592 B1 and WO 03/096071 A1 becomes superfluous due to the internal position sensor.

Based on the strength of the compensation currents, the dynamic output signals of the geophones can be transformed using an analog or digital coordination rotation arrangement in a subsequent processing pass. These become identical to the ones generated by a properly leveled seismometer under otherwise identical conditions. Such an "auto-leveling" seismometer is particularly advantageous when manual leveling is uneconomical as e.g. on the seabed. Thus, electronic coordinate rotation based on tilt information supersedes contemporary solutions by means of mechanical arrangements as e.g. gimballed suspensions.

When the time constant of the tilt compensation control is chosen so that it is well below the lowest seismic frequency to be detected, the auto-leveling mechanism does not interfere with the seismic output signal and continually runs as a background control process. Therefore, the auto-leveling seismometer responds to sudden position changes e.g. due to strong water currents in much the same way as a gimbal mounted system, producing proper vertically aligned signals after a while.

In another embodiment, the coordinate rotation is performed in a subsequent processing pass when the strength of the compensation currents is recorded as well as the seismic signals. This can e.g. be realized by using a multiplexer arrangement, which either places the seismic signals or the compensation information on the signal wires, depending on a control signal from the recording unit, which minimizes the number of wires.

In yet another embodiment of the present invention, the strength of the compensation currents are added suitably scaled to the seismic signals as a quasi-static fraction. Then currently available recording units can be used unmodified without the need for additional control or signal lines. Coordinate rotation is performed as a first pass of digital post processing after extracting the compensation information by means of a digital lowpass filter. The latter method hardly affects the dynamic range that can be utilized for the seismic signals proper because a position accuracy of one degree is sufficient. Therefore, 9 bits of resolution are required for the compensation information, whereas contemporary data recorders have an effective resolution of typically 20 bits (120 dB).

When an electronic compass is added to the 3-component seismometer arrangement, which is able to detect the azimuth independent of its position, its signal can be added to the seismic signal of one of the three geophones (as described above) because the total vertical tilt itself can be characterized by two tilt angles alone. Then a fully normalized 3-dimensional seismic image can be produced in said digital post processing pass.

In another embodiment, the azimuth can be determined using an electronic inertial system instead of a compass, whose position information can be recorded shortly after deployment of the seismometer arrangement on the seabed after proper calibration on deck.

In the following section an electronic arrangement is disclosed, which makes it possible to detect femtofarad capacity changes.

FIG. 3 is a block diagram of an electronic circuit, which translates the displacement of the seismic mass of a geophone into a voltage Uoffset. Said capacitive position sensor that is mounted inside the geophone enclosure is integrated into a measurement bridge as C_geophon and the bridge consists of the additional elements R_geophon, R_ref and C_ref. The bridge is excited by Logic Clock with a 50% duty cycle. This produces an output signal on Difference Amplifier that is phase and amplitude modulated by changes of C_geophon. At first the output is filtered in Bandpass, which both suppresses noise and increases the sensitivity of the measurement bridge due to resonance peaking. Afterwards the signal is fed into Synchronous Rectifier and becomes available as output Uoffset after Lowpass filtering. Uoffset is proportional to the difference between a resting position of the seismic mass and its current position. The resting position can be easily set by adjusting R_ref.

In the following section a method and an electronic circuit are disclosed, which use the information of the position sensor to realize an exploration-seismic geophone that fully compensates the influence of gravity on the seismic mass. The compensation information is added to the wanted seismic signal so that a precise vertical alignment of a 3-component arrangement can be performed in a post processing pass on the digitized data later on.

To this end Uoffset is integrated with an integration time constant that is well below the wanted seismic signal, i.e. below 4 Hz. The output signal of the integrator is fed into the coil of the geophone as a compensation current and its polarity is chosen so that it counteracts the influence of gravity. The wanted seismic signal is decoupled from the geophone by a capacitor, which blocks the compensation current potential that builds across the geophone's coil resistance. A fraction of the compensation signal is added to the seismic signal after the decoupling capacitor. Thus the information on the vertical tilt fits into just 1% of dynamic range that is usually available.

FIG. 4 is a circuit diagram of an electronic arrangement that realizes all aspects of above discussed method. Op_geo, R_sigma and C_sigma constitute the integrator, which is fed by Uoffset. The geophone respectively signal "geophon" is connected to damping resistor R_damp via decoupling capacitor C_lowsignal. Simultaneously, signal "geophon" is added to the integrator via highpass C1/R1 and the sum is fed into the geophone via decoupling resistor R2, which feeds a compensation current into the geophone that is largely proportional to the charge on C_sigma. A fraction of the compensation information is added to "Voutput" via resistive divider R_static/R_damp, which is appropriate for the digital coordinate transformation post processing pass.

In a further embodiment, the geophone augmented by the position sensor is used to realize a broadband seismometer as needed e.g. for teleseismic research. The frequency band of interest spans from 0.01 Hz to 50 Hz, which is far below the mechanical resonance of geophones.

Such a wide bandwidth with a lower end of 100 seconds waves can be realized using the geophone with position sensor of the present invention in an active feedback loop, which pushes the seismic mass in the same direction as the seismic movements of the geophone enclosure. Thus the seismic mass hardly moves at all relative to its enclosure almost completely eliminating the influence of the spring-mass system on the transfer characteristic.

A further advantage of this arrangement is a seismic output signal that is proportional to the seismic velocity generated as a by product of the feedback control circuit.

Figure 5:
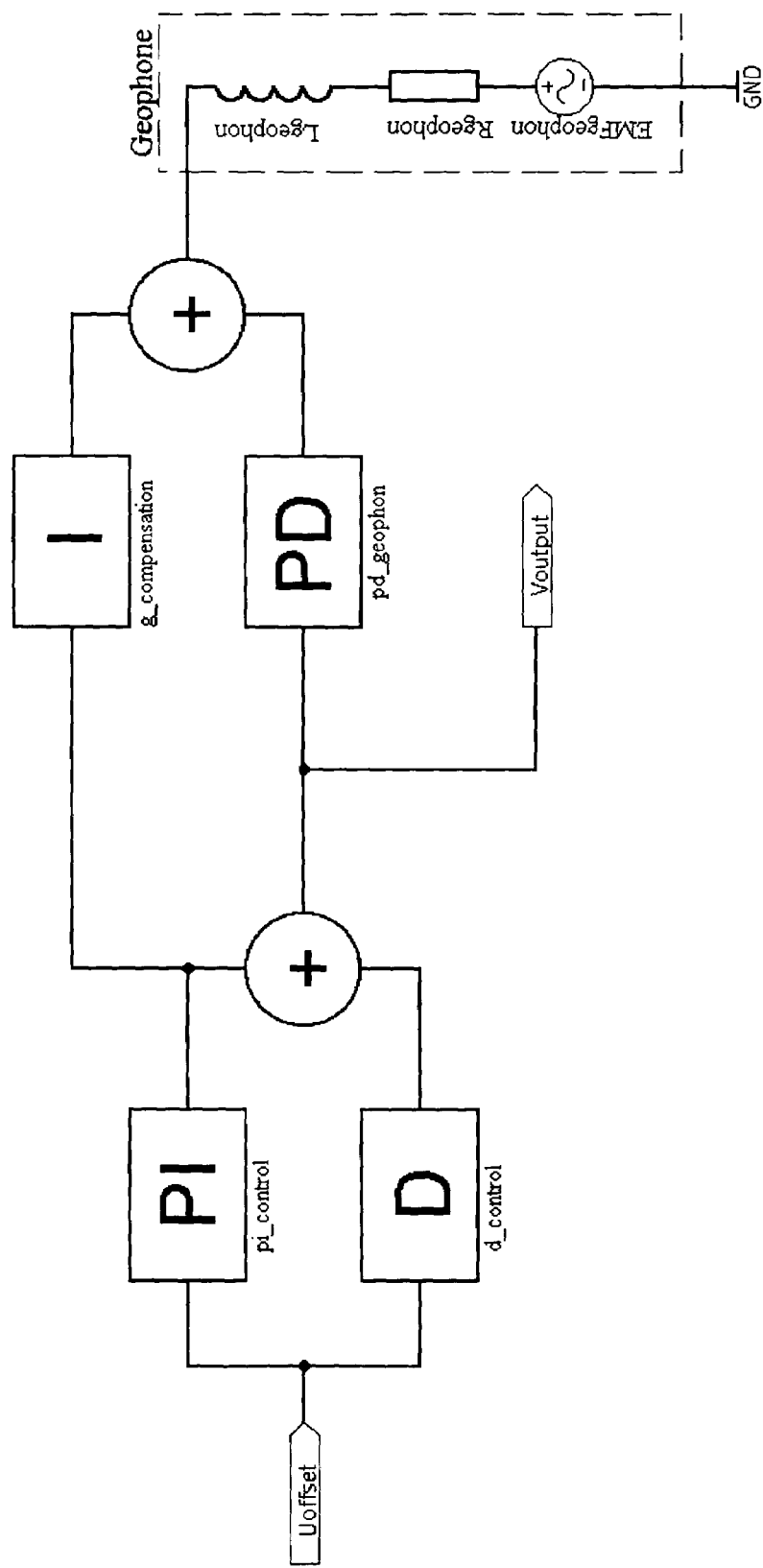
FIG. 5 is a block diagram of a feedback control circuit for a broadband seismometer with an output signal that is proportional to the velocity of the seismic movement.

FIG. 5 is a block diagram of an embodiment of the control circuit for a velocity sensitive broadband seismometer. The transfer characteristic of the entire feedback system must be of an integrative nature, because the inertial force that moves the seismic mass relative to the magnet is proportional to the seismic ground acceleration. In a feedback system, this needed characteristic can only be realized by giving the section of the control circuit leading towards the wanted velocity output an integrating characteristic, and giving the section leading from said output back towards the seismic mass a differentiating characteristic. The phase inversion introduced by the mechanical resonance of the geophone system can be smoothed by a spectral multiplication of Uoffset with the inverse of the transfer characteristic of the geophone itself, followed by an integration when the seismometer is supposed to exhibit a uniform seismic frequency response even below its mechanical resonance. This is accomplished by the first PID controller (pi_control, d_control) that is fed by Uoffset. Its output produces the wanted measurement signal Voutput, which is proportional to the seismic velocity. Besides the differentiator (pd_qeophon), the feedback path includes another integrator g_compensatlon for gravity compensation. The added proportional control part of pd_geophon serves to damp the inserted second order resonance pole. The resulting control signal, which is proportional to the ground acceleration in the measurement bandwidth, is fed into the geophone's coil that consequently acts as an actuator. Of course, the injected current due to the control voltage driving the coil's equivalent resistance Rgeophon is modified by the coil's inductance Lgeophon as well as by its electromotive force EMFgeophon, which is generated because of the residual movement of the coil relative to the magnet.

Figure 6:
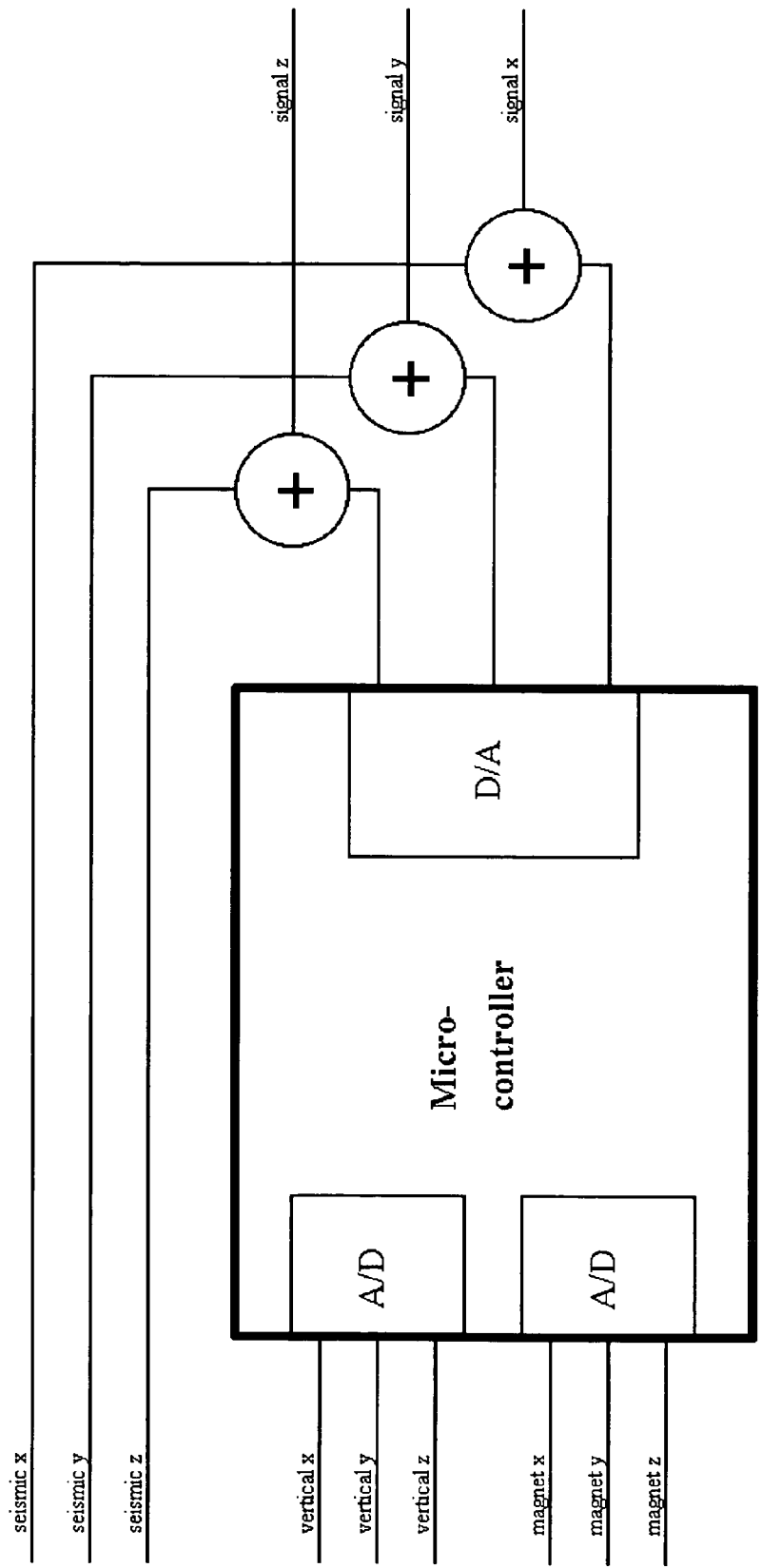
FIG. 6 is a block diagram of a micro-controller arrangement that adds correction information to the seismic signals for subsequent spatial normalization via coordinate transformation.

An unambiguous spatial orientation of the seismic signals of a 3-component seismometer respectively of a gravity compensated 3-component geophone does not only call for a vertical alignment of the "Z component" w.r.t. the direction of gravity but also for a horizontal alignment of its North-South respectively East-West signals (X and Y components). We propose to integrate an electronic compass or an electronic inertial system into the seismometer housing for this purpose. According to the present invention, the gravity compensation information of each of the three geophones are available for the vertical alignment of the Z component. The electronic compass for example would deliver analog data of the earth's magnetic field in all three spatial directions: Hx, Hy, and Hz. These six constitutive parameters can be processed by a micro controller arrangement, according to FIG. 6 with A/D and D/A interfaces computing three analog compensation signals for the pitch, roll, and rotation angles, which can be added to one of the seismic signals each appropriately scaled. 10 bits of resolution for the computations inside the micro controller are sufficient because 1 degree of precision for spatial resolution suffices. In addition, computation speed requirements are very moderate, because the spatial orientation of the seismometer is a quasi-static phenomenon. In a subsequent processing pass the compensation angle information and the seismic signals proper can be separated by digital filtering and thus a normalized 3-dimensional seismic signal can be produced by coordinate transformation.

Although specific embodiments have been illustrated and described, it is obvious to those skilled in the art that various modifications may be made without departing from what is intended to be limited solely by the appended claims.

What we claim is:

1. A method for acquiring seismic movements in at least one direction, the method comprising providing a seismic sensor comprising a coil and a permanent magnet (8) capable of performing relative movements against each other inside an enclosure, measuring the current induced in the coil as an electrical representation of the seismic movement, wherein additional position detector means inside the enclosure measure the relative position of the coil with respect to the permanent magnet and additional control means feed a compensation current into said coil so that the coil recaptures a predetermined position with respect to the permanent magnet, further comprising using an integrator of the control means for increasing or decreasing the compensation current until the coil has reached a predetermined position.

2. A method according to claim 1, comprising feeding back a position signal derived from the position detector into the coil by means of the integrator.

3. A method according to claim 2, wherein the geophone's highpass filtered seismic output signal is added to the output signal of the compensation current control means coupling the sum into the geophone's coil.

4. A method according to claim 2, wherein the seismic output signal is decoupled using a highpass, adding a fraction of the output signal of the compensating current control means as tilt information to the wanted output signal.

5. A method according to claim 1, comprising adding the geophone's highpass filtered seismic output signal to the output signal of the compensation current control means coupling the sum into the geophone's coil.

6. A method according to claim 1, comprising decoupling the seismic output signal using a highpass adding a fraction of the output signal of the compensation current control means as tilt information to the wanted output signal.

7. A method according to claim 1, comprising measuring the measurement signal provided by the position sensor by a control circuit that generates a position control feedback signal for coil, a wanted seismic output signal, and a tilt information signal.

8. An apparatus for the acquisition of seismic movements comprising at least one coil (2) and one permanent magnet (8) inside an enclosure (7), in which said permanent magnet is rigidly fixed to said enclosure and said coil can move along its longitudinal axis relative to said permanent magnet and said enclosure and in which said coil is connected to measurement means to measure the electrical current flowing through the coil, wherein said coil is connected to a feedback arrangement consisting of a control circuit present for a current flowing through the coil at least temporarily and the control also being connected to a position sensor acquiring the momentary position of said coil relative to said permanent magnet, wherein the control means includes an integrator for increasing or decreasing the compensation current until the coil has reached a predetermined position.

9. An apparatus according to claim 8, wherein the position sensor is integrated into a measurement bridge arrangement excited by a clock signal and said measurement bridge being followed by a synchronous rectifier.

10. An apparatus according to claim 9, wherein a bandpass filter is inserted between said measurement bridge and said synchronous rectifier.

11. An apparatus according to claim 10, wherein three geophones with integrated position sensors are rigidly arranged at preset angles relative to the longitudinal axes of their coils.

12. An apparatus according to claim 10, wherein data logging means for at least the wanted seismic signal resp. the seismic signals are arranged adjacent to enclosures.

13. An apparatus according to claim 9, wherein three geophones with integrated position sensors are rigidly arranged at preset angles relative to the longitudinal axes of their coils.

14. An apparatus according to claim 13, wherein data logging means for at least the wanted seismic signal resp. the seismic signals are arranged adjacent to enclosure.

15. An apparatus according to claim 14, wherein an electronic compass or an electronic inertial system is rigidly connected to the geophone arrangement and the tilt information of the geophones and the additional position information of the compass resp. the inertial system serve as inputs into an adjacent microprocessor system, which computes three correction signals fed into adding means, fractionally adding each of the correction signals to one of the seismic output signals of the geophones.

16. An apparatus according to claim 13, wherein an electronic compass or an electronic inertial system is rigidly connected to the geophone arrangement and the tilt information of the geophones and the additional position information of the compass or the inertial system serve as inputs into an adjacent microprocessor system, which computes three correction signals fed into adding means, fractionally adding each of the correction signals to one of the seismic outputs signals of the geophones.

17. An apparatus according to claim 8, wherein coil that can move relative to permanent magnet is suspended resiliently.

\* \* \* \* \*